(12) United States Patent
Ohtsubo et al.

(10) Patent No.: US 8,094,993 B2
(45) Date of Patent: Jan. 10, 2012

(54) VIDEO RECORDING DEVICE, VIDEO RECORDING METHOD, VIDEO RECORDING PROGRAM, AND INTEGRATED CIRCUIT

(75) Inventors: Shohji Ohtsubo, Osaka (JP); Naohisa Tanabe, Osaka (JP); Iku Ohama, Osaka (JP)

(73) Assignee: Pansonic Corporation, Osaka (JP)

( * ) Notice: Subject to any disclaimer, the term of this patent is extended or adjusted under 35 U.S.C. 154(b) by 441 days.

(21) Appl. No.: 12/514,496

(22) PCT Filed: Oct. 16, 2008

(86) PCT No.: PCT/JP2008/002938
§ 371 (c)(1),
(2), (4) Date: May 27, 2009

(87) PCT Pub. No.: WO2009/050894
PCT Pub. Date: Apr. 23, 2009

(65) Prior Publication Data
US 2009/0304345 A1 Dec. 10, 2009

(30) Foreign Application Priority Data
Oct. 17, 2007 (JP) ................................. 2007-270105

(51) Int. Cl.
*H04N 9/80* (2006.01)
*H04N 5/78* (2006.01)
*H04N 5/783* (2006.01)
*H04N 5/93* (2006.01)

(52) U.S. Cl. ......... 386/248; 386/326; 386/343; 386/353

(58) Field of Classification Search .................. 386/248, 386/326, 343, 353
See application file for complete search history.

(56) References Cited

U.S. PATENT DOCUMENTS

| 2003/0113099 A1 | 6/2003 | Kaku |
| 2005/0210519 A1 | 9/2005 | Ito |
| 2006/0013561 A1 | 1/2006 | Kaku |
| 2006/0195486 A1 | 8/2006 | Ohno et al. |

(Continued)

FOREIGN PATENT DOCUMENTS

JP  2004-112369  4/2004

(Continued)

OTHER PUBLICATIONS

International Search Report issued Dec. 22, 2008 in the International (PCT) Application of which the present application is the U.S. National Stage.

*Primary Examiner* — Helen Shibru
(74) *Attorney, Agent, or Firm* — Wenderoth, Lind & Ponack, L.L.P.

(57) ABSTRACT

A video recording apparatus that prevents screen malfunctions due to playback of incomplete frame image data, even when a power failure has occurred while recording frame image data received via a network to a recording medium, and incomplete frame image data has been recorded. The video recording apparatus includes a reception unit 1001 that receives management information attached to each piece of data, a first recording unit 1003 that records the received video data to the recording medium 1010, and a second recording unit 1004 that records position information of the video data to the recording medium. The video recording apparatus quickly specifies damaged data positions by referencing a file length of the video data file 1005, and a position information file 1006.

14 Claims, 11 Drawing Sheets

U.S. PATENT DOCUMENTS

2007/0143807 A1 6/2007 Suneya
2011/0033172 A1* 2/2011 Ando et al. .................. 386/355

FOREIGN PATENT DOCUMENTS

| | | |
|---|---|---|
| JP | 2004-152458 | 5/2004 |
| JP | 2005-302276 | 10/2005 |
| JP | 3733061 | 10/2005 |
| JP | 2006-54805 | 2/2006 |
| JP | 2006-236161 | 9/2006 |
| JP | 2007-173987 | 7/2007 |

* cited by examiner

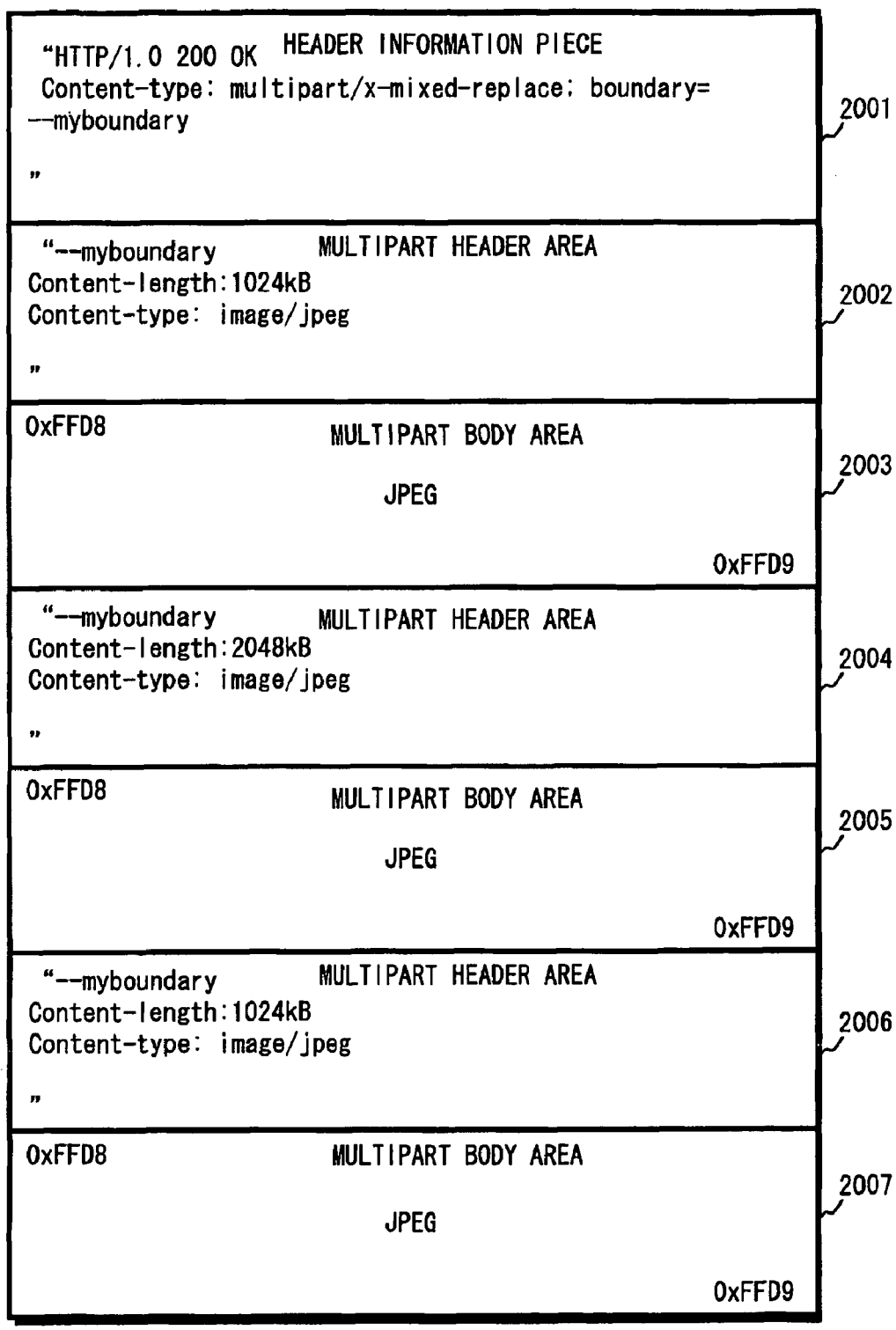

FIG. 8

| FRAME NUMBER | FRAME OFFSET | FRAME SIZE |
|---|---|---|
| 0 | 0 | 1024 |
| 1 | 1024 | 2048 |
| 2 | 3072 | 1024 |

| INODE INFORMATION | | | |
|---|---|---|---|
| INODE NUMBER | FILE NAME | BLOCK NUMBER(S) OF USED BLOCKS | DATA LENGTH L |
| 1 | FILE 1 | 1, 2 | 6144 |

| FREE BLOCK BIT MAP |
|---|
| 3, 4, 5, 6, ··· |

| FRAME NUMBER | FRAME OFFSET | FRAME SIZE |
|---|---|---|
| 0 | 0 | 3072 |
| 1 | 3072 | 3072 |

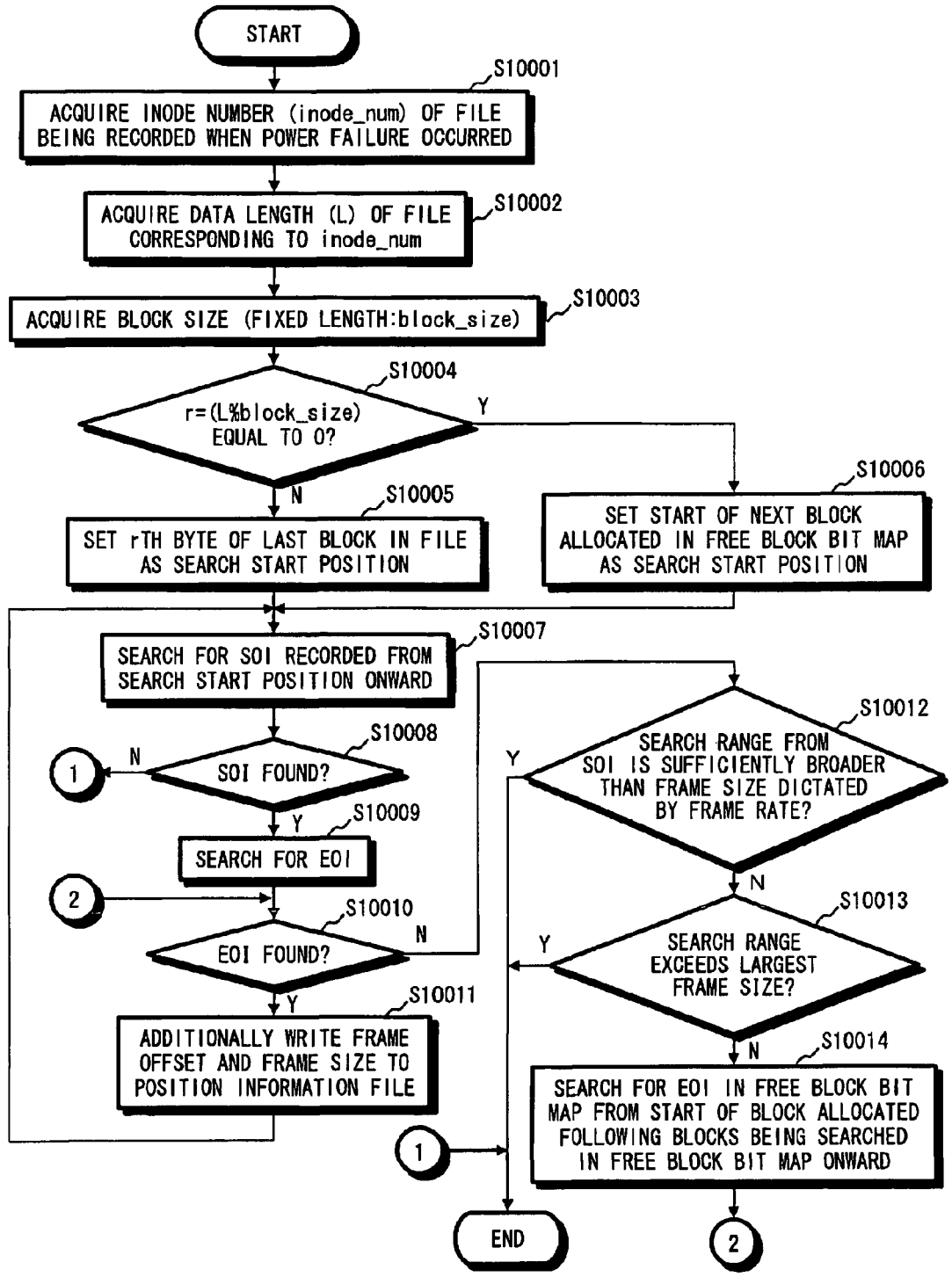

VIDEO RECORDING DEVICE, VIDEO RECORDING METHOD, VIDEO RECORDING PROGRAM, AND INTEGRATED CIRCUIT

TECHNICAL FIELD

The present invention relates to a video recording apparatus, and in particular, to processing for playing back video data that has been damaged due to a power failure, etc. that occurred when the video data was being recorded.

BACKGROUND ART

In recent years, consumer-use video recording equipment, as typified by hard disk recorders, has become widespread. As one application of such video recording equipment, a use mode has been proposed in which videos of visitors during an absence of a user, captured with use of a door intercom camera, are recorded on a consumer-use recorder via a network, and the videos are put to use in preventing crime.

Here, in the case of consumer use, high quality is required of the images that are recorded and played back by the equipment. Even if data that is being recorded is damaged, for example when a power failure or a slippage of a cord from an electrical socket occurs during recording, screen malfunctions, etc. when playing back the data are not allowable.

For this reason, as technology for handling the damage to data, a technology has been disclosed in which, after recording, as consecutive images, a plurality of JPEG images generated by an encoding unit of a digital camera, a bit search is performed for marker bits that exist at a starting point and a termination point of each JPEG, recognizing a position at which an inconsistency has occurred as a damaged portion, and removing the damaged portion from the JPEGs targeted for playback (for example, see Patent Document 1).
Patent Document 1: Japanese Patent No. 3733061

DISCLOSURE OF THE INVENTION

Problems Solved by the Invention

However, according to the conventional structure described above in the Background Art, it is necessary to perform a bit search for marker bits that exist at a starting point and a termination point of recorded JPEG images. To perform the bit search, it is necessary to read video data from recorded video files to a memory, and to perform processing, with use of a CPU, to compare the marker bits to each piece of the read data, until the marker bits are found. If this processing of bit searching, etc. is performed upon restarting after a power failure, an issue arises that a long time period is required, after restarting, until reaching a routine operational state.

In view of the above issue, an object of the present invention is to provide a video recording apparatus that can, more quickly than conventional technology, restart, prevent playing back incomplete data, and suppress the occurrence of screen malfunctions, even in a case that recording is interrupted and incomplete data is recorded when a power failure occurs in the midst of recording video received via a network.

Means to Solve the Problems

In order to solve the above problem, a video recording apparatus that is an embodiment of the present invention includes a video recording apparatus that records a plurality of frame image data pieces, including: a reception unit operable to receive communication data including a plurality of pairs of a frame image data piece and a size information piece indicating a size of the frame image data piece; a recording unit operable to extract the frame image data pieces and the size information pieces from all of the pairs in the communication data and to record the extracted size information pieces and frame image data pieces to a recording medium; a comparison unit operable to compare (i) a total actual size that is a total of actual sizes of all of the frame image data pieces recorded on the recording medium and (ii) a total management size that is a total of sizes indicated by the size information pieces; a specification unit operable to, when the total actual size is smaller than the total management size, with use of (i) a difference between the total actual size and the total management size and (ii) the size information pieces, specify an incomplete frame image data piece from which data is partially missing; and a management unit operable to prevent playback of the specified incomplete frame image data piece.

Effects of the Invention

By including the above-described structure, a video recording apparatus that is an embodiment of the present invention verifies whether damage has occurred to frame image data merely by performing simple processing of comparing the total actual size to the total management size to obtain a difference, and specifies damaged frame image data pieces based on the difference and size information, without performing load-increasing and time-consuming processing such as examining all frame image data pieces to determine if damage has occurred. Therefore, the video recording apparatus, more quickly than conventional technology, can judge whether damaged frame images exist, specify the damaged frame images, and prevent a case in which damaged frame image data is played back and a video malfunction occurs.

Typically, the specification of damaged frame image data pieces is performed upon restarting after a power supply interruption has occurred due to a power failure or the like during recording of frame image data to a recording medium, and in such a case, the video recording apparatus of the present invention can specify damaged frame image data in a shorter time period than conventional technology, and can reduce the time required for reaching a normal state.

BRIEF DESCRIPTION OF THE DRAWINGS

FIG. 2 shows a response message transmitted from a network camera system according to embodiment 1 of the present invention;

FIG. 8 shows an overall structure of a position information file generated according to embodiment 2 of the present invention;

FIG. 11 is a flowchart showing processing for searching for JPEG image data according to embodiment 3 of the present invention.

Figure 1:
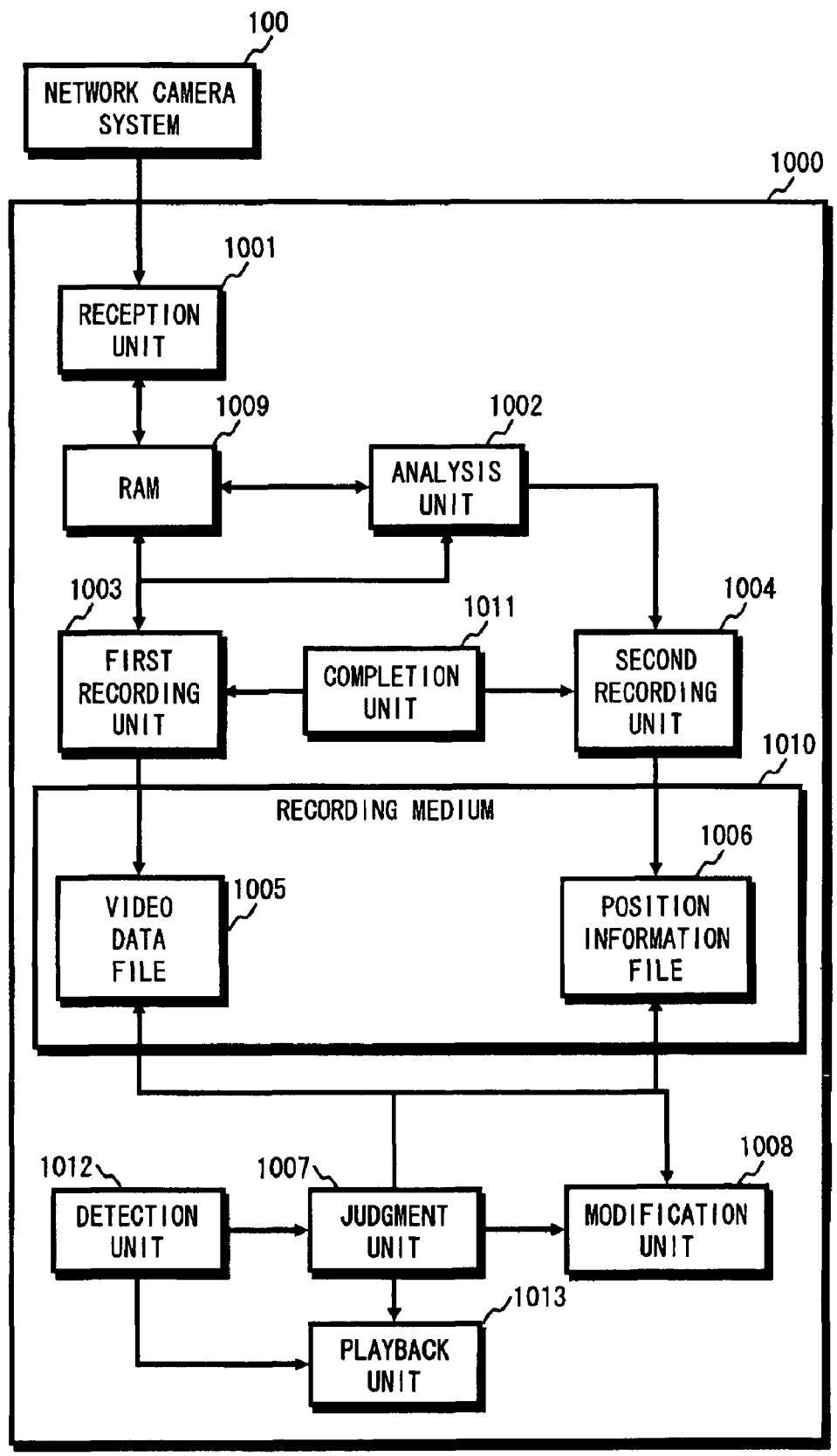
FIG. 1 shows a structure of a video recording apparatus according to embodiment 1 of the present invention.

DESCRIPTION OF THE CHARACTERS 100 network camera system
1000 video recording apparatus
1001 reception unit
1002 analysis unit
1003 first recording unit
1004 second recording unit
1005 video data file
1006 position information file
1007 judgment unit
1008 modification unit
1012 detection unit
1013 playback unit

BEST MODE FOR CARRYING OUT THE INVENTION

A video recording apparatus that is an embodiment of the present invention is a video recording apparatus that records a plurality of frame image data pieces, including: a reception unit operable to receive communication data including a plurality of pairs of a frame image data piece and a size information piece indicating a size of the frame image data piece; a recording unit operable to extract the frame image data pieces and the size information pieces from all of the pairs in the communication data and to record the extracted size information pieces and frame image data pieces to a recording medium; a comparison unit operable to compare (i) a total actual size that is a total of actual sizes of all of the frame image data pieces recorded on the recording medium and (ii) a total management size that is a total of sizes indicated by the size information pieces; a specification unit operable to, when the total actual size is smaller than the total management size, with use of (i) a difference between the total actual size and the total management size and (ii) the size information pieces, specify an incomplete frame image data piece from which data is partially missing; and a management unit operable to prevent playback of the specified incomplete frame image data piece.

Also, the recording unit may sequentially record the frame image data pieces to logically consecutive areas in the recording medium, the recording unit being further operable to, for each size information piece, calculate an offset that is a total size of all frame image data pieces recorded in advance of the frame image data piece pertaining to the size information piece, and record the size information pieces in correspondence with the respective offsets thereof, and the specification unit may be further operable to detect, with use of the offsets, a starting position of the incomplete frame image data piece.

Also, the specification unit may include a selection subunit operable to select each of the offsets corresponding to the respective size information pieces in a reverse order starting from a most recently recorded offset, a search subunit operable to, each time an offset is selected by the selection subunit, search for an incomplete frame image data piece recorded from a position indicated by the offset onwards in the consecutive areas, and a determination subunit operable to, if an incomplete frame image data piece is found, determine that the starting position is an offset corresponding to the size information pertaining to the incomplete frame image data piece.

According to this structure, since a total of the sizes indicated by the size information pieces is obtained in advance and offsets are calculated and stored in correspondence with the size information pieces, when restarting after a power supply interruption etc., performing processing to obtain a total of the sizes for specifying the damaged frames is not necessary, and therefore damaged frames can be specified more quickly.

Also, the specification unit, to prevent the playback of the incomplete frame image data piece, may be further operable to delete a size information piece and an offset corresponding to the incomplete frame image data piece.

According to this structure, incomplete frame image data pieces are specified with use of the size information pieces and the offsets, and the playback of the incomplete frame image data pieces can be prevented.

Also, the management unit may be further operable to delete, from the recording unit, any size information pieces and any offsets recorded in a recording area from the starting position onwards.

This structure enables avoiding a state of inconsistency in which even though a size information piece and an offset are recorded, the frame image data piece corresponding to the size information piece is not recorded.

Also, the communication data may include a plurality of parts that are compliant with HTTP, each of the parts respectively including one pair of a frame image data piece and a size, and the recording unit, for each of the parts, may extract a size included in the part as a size information piece, extract a frame image data piece included in the part, and record the extracted size information piece and the extracted frame image data piece, in correspondence with each other, to the recording medium.

According to this structure, in a case in which the frame image data is transmitted by communication data that is compliant with HTTP, the size information pieces and the frame image data pieces can be appropriately recorded.

Also, the specification unit may be further operable to judge whether a total size of the size information pieces recorded on the recording medium is a multiple of a predetermined size, and if the judgment is negative, to delete a last-recorded size information piece.

According to this structure, detecting missing data in the size information pieces can be performed by a simple method such as simple division.

Also, the video recording apparatus may further include a search unit operable to, if the total actual size is larger than the total management size, with use of the total management size, search for a frame image data piece from a specified search start position; and an additional writing unit operable to, if a frame image data piece is found by the search unit, calculate a size of the found frame image data piece, and additionally write a size information piece indicating the calculated size to the recording medium.

Also, the video recording apparatus may further include: a file system, wherein the file system allocates recording areas in the recording medium to files, and all of the frame image data pieces are stored in one file, the video recording apparatus may further include a search unit operable to, if a power supply interruption is detected, search for a frame image data piece recorded in a recording area to be next allocated by the file system; and an additional writing unit operable to, if the frame image data piece is found, calculate a size of the frame image data piece and additionally write the calculated size to the recording medium as the size information piece.

According to this structure, when more frame image data pieces than size information pieces are recorded on the recording medium, without receiving the communication data again, size information can be generated for the frame image data pieces corresponding to the difference between the number of size information pieces and the number of frame information pieces.

Also, in the video recording apparatus, each frame image data piece may include a time stamp, and the additional writing unit only performs the additional writing if the time stamp of the frame image data piece found in the search indicates a later date and time than the time stamp of a last frame image data piece stored in the file.

According to this structure, a judgment can be made as to whether the frame image data piece corresponding to the difference is related to the frame image data piece recorded in correspondence with the size information piece, thus enabling preventing a size information piece being generated for a frame image data piece that is not related.

Also, the recording unit may further include a first recording subunit operable to record the frame image data piece to the recording medium, and a second recording subunit operable to record the size information piece to the recording medium, wherein the first recording subunit and the second recording subunit perform recording asynchronously.

This structure enables realizing a system in which the frame image data piece and the size information piece can be written separately and independently of each other.

An image recording method of the present invention is a video recording method for recording a plurality of frame image data pieces, including: a reception step of receiving communication data including a plurality of pairs of a frame image data piece and a size information piece indicating a size of the frame image data piece; a recording step of extracting the frame image data pieces and the size information pieces from all of the pairs in the communication data and recording the extracted size information pieces and frame image data pieces to a recording medium; a comparison step of comparing (i) a total actual size that is a total of actual sizes of all of the frame image data pieces recorded on the recording medium and (ii) a total management size that is a total of sizes indicated by the size information pieces; a specification step of, when the total actual size is smaller than the total management size, with use of (i) a difference between the total actual size and the total management size and (ii) the size information pieces, specifying an incomplete frame image data piece from which data is partially missing; and a management step of preventing playback of the specified incomplete frame image data piece.

An image recording program of the present invention is a video recording program used in a video recording apparatus that records a plurality of frame image data pieces, including: a reception step of receiving communication data including a plurality of pairs of a frame image data piece and a size information piece indicating a size of the frame image data piece; a recording step of extracting the frame image data pieces and the size information pieces from all of the pairs in the communication data and recording the extracted size information pieces and frame image data pieces to a recording medium; a comparison step of comparing (i) a total actual size that is a total of actual sizes of all of the frame image data pieces recorded on the recording medium and (ii) a total management size that is a total of sizes indicated by the size information pieces; a specification step of, when the total actual size is smaller than the total management size, with use of (i) a difference between the total actual size and the total management size and (ii) the size information pieces, specifying an incomplete frame image data piece from which data is partially missing; and a management step of preventing playback of the specified incomplete frame image data piece.

An integrated circuit of the present invention is an integrated circuit for recording a plurality of frame image data pieces, including: a reception step of receiving communication data including a plurality of pairs of a frame image data piece and a size information piece indicating a size of the frame image data piece; a recording step of extracting the frame image data pieces and the size information pieces from all of the pairs in the communication data and recording the extracted size information pieces and frame image data pieces to a recording medium; a comparison step of comparing (i) a total actual size that is a total of actual sizes of all of the frame image data pieces recorded on the recording medium and (ii) a total management size that is a total of sizes indicated by the size information pieces; a specification step of, when the total actual size is smaller than the total management size, with use of (i) a difference between the total actual size and the total management size and (ii) the size information pieces, specifying an incomplete frame image data piece from which data is partially missing; and a management step of preventing playback of the specified incomplete frame image data piece.

According to this structure, since a total of the sizes indicated by the size information pieces is obtained and offsets are calculated and stored in correspondence with the size information pieces in advance, there is no longer a necessity, when specifying damaged frames at a time such as upon restarting after a power supply interruption, to perform processing to obtain a total of the sizes, thus enabling more high-speed specification of the damaged frames.

The monitoring system pertaining an embodiment of the present invention includes a network camera system and a video recording apparatus. The network camera system captures video and transmits the video data to the video recording apparatus. The video recording apparatus receives and records the video data. The monitoring system is provided, for example, in a store or a private residence, and is used to constantly record video of a place that has been targeted for monitoring. If an incident occurs at the place being monitored, the video is played back and analyzed, for example in a case that identification of a culprit or a suspicious individual is necessary.

The network camera system records the captured video in a motion JPEG (Joint Photographic Experts Group) format, and transmits each JPEG image data piece included in the motion JPEGs to the video recording apparatus according to HTTP (HyperText Transfer Protocol).

The video recording apparatus temporarily accumulates reception data received from the network camera system in a reception buffer, analyzes the reception data, removes JPEG image data from the reception data and records the JPEG image data to a recording medium such as a hard disk drive, a DVD media, or a flash media.

Here, in the video recording apparatus, if a power supply interruption occurs during a time after the reception data has been accumulated in the buffer and before all of the JPEG image data pieces have finished recording to the recording medium, for example if a power failure occurs or the power supply cord of the video recording apparatus slips out, there are cases in which incomplete JPEG image data pieces (for example, data corresponding to only half of an image) are recorded to the recording medium.

In such a case, by using a later-described position information file, the video recording apparatus searches for and finds the incomplete JPEG image data pieces more quickly than in conventional technology. To prevent screen malfunctions, the found JPEG image data pieces are not displayed on a display or the like.

A monitoring system pertaining to an embodiment of the present invention is described below with reference to the drawings.

1. Embodiment 1

1.1 Structure

FIG. 1 shows a structure of the monitoring system.

The monitoring system includes a network camera system 100 and a video recording apparatus 1000.

The network camera system 100 captures video, and records the captured video as video data in the motion JPEG format.

Upon receiving a GET command stipulated in HTTP from the video recording apparatus 1000, the network camera system 100 transmits each piece of the JPEG image data included in the motion JPEG format video data to the video recording apparatus according to HTTP.

FIG. 2 shows an exemplary response message transmitted from the network camera system 100 to the video recording apparatus as a response to the GET command.

The response message is compliant with a general HTTP multipart format (reference document: RFC2046), and includes header information and a data entity.

As shown in FIG. 2, the response message 2000 includes a header information piece 2001, a multipart header area 2002, a multipart body area 2003, a multipart header area 2004, a multipart body area 2005 . . . and so on.

Here, according to the HTTP multipart format, blank lines are inserted between multipart header areas and multipart body areas. In FIG. 2, for simplicity, a blank line is depicted as being included in the multipart header areas.

The multipart header area 2002 starts from a boundary character string designated in a "boundary" field of the header information piece 2001 of the HTTP response message.

In the present embodiment, the boundary character string is "- -myboundary".

Also, in a "Content-length" field shown in the multipart header area 2002, the size of the next sequential multipart body area 2003 is specified.

The multipart body area 2003 is JPEG image data corresponding to one frame worth of images captured/generated by a camera. As described above, the size of the JPEG image data is consistent with the size specified in the "Content-length" field shown in the multipart area appearing immediately previously.

The data structure, etc. of the multipart header areas 2004, 2006, and so on is similar to that of the multipart header area 2002.

Also, the data structure, etc. of the multipart header areas 2005, 2007, and so on is similar to that of the multipart body area 2003.

As shown in FIG. 1, the video recording apparatus 1000 includes a reception unit 1001, an analysis unit 1002, a first recording unit 1003, a second recording unit 1004, a judgment unit 1007, a modification unit 1008, a RAM 1009, a recording medium 1010, a completion unit 1011, a detection unit 1012 and a playback unit 1013.

The reception unit 1001 receives response messages transmitted from the network camera system 100, sequentially stores the received response messages in the RAM 1009, and notifies the analysis unit 1002, by transmitting an analysis start signal, each time a predetermined amount of data is stored.

Upon receiving the analysis start signal from the reception unit 1001, the analysis unit 1002 parses the response message stored in the RAM 1009.

To parse the response message, the analysis unit 1002 first searches the header information and the multipart header areas included in the response message.

Here, a character string such as "HTTP/1.0 200OK" included in the header information is used as a keyword to search for the header information. Also, since the multipart header area is surrounded by the boundary character string and a blank line, a pair of the boundary character string and the blank line are used as the keyword.

When the header information is found, the analysis unit 1002 writes the video data file 1005 to the recording medium 1010 via the first recording unit 1003, and writes the position information file 1006 to the recording medium 1010 via the second recording unit 1004. At this time, the video data file 1005 and the position information file 1006 are in an initialized state (a state in which a size of the file is 0 or is embedded with invalid characters).

Here, the position information file and the video data file are described.

Figures 3A, 3B:
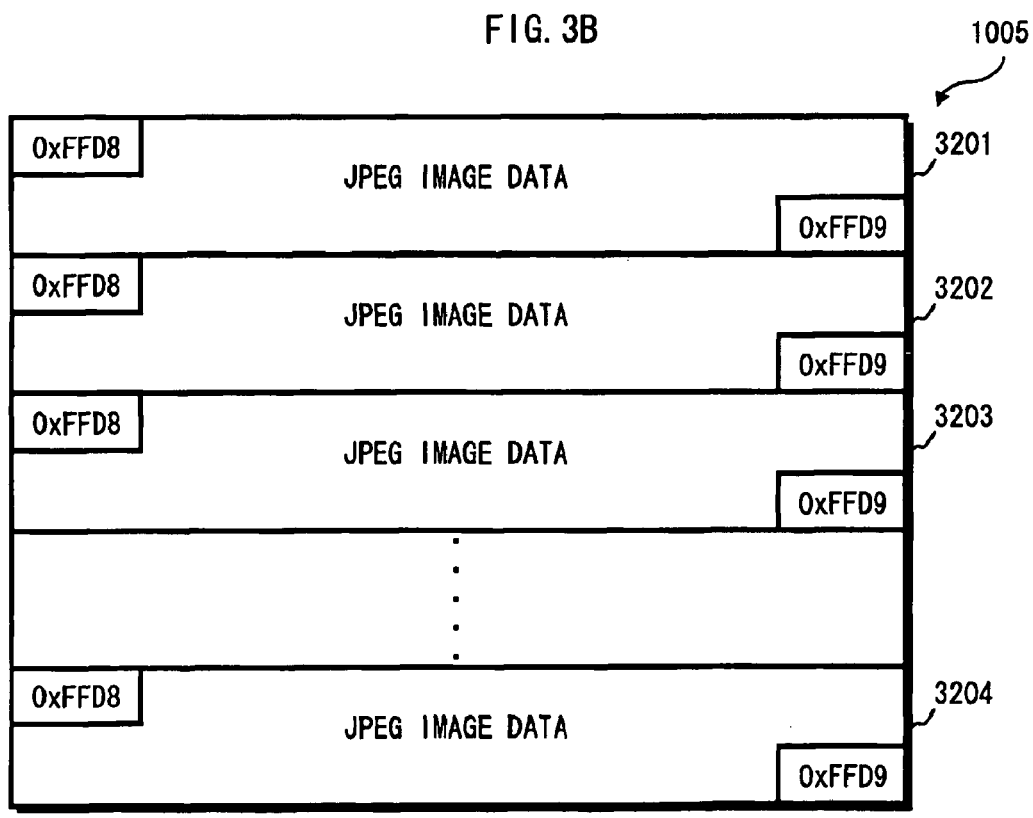
FIG. 3A shows an exemplary structure of a position information file generated by a first recording unit according to the embodiment of the present invention.
FIG. 3B shows an overall structure of JPEG image data stored by a second recording unit according to embodiment 1 of the present invention.
Figure 4:
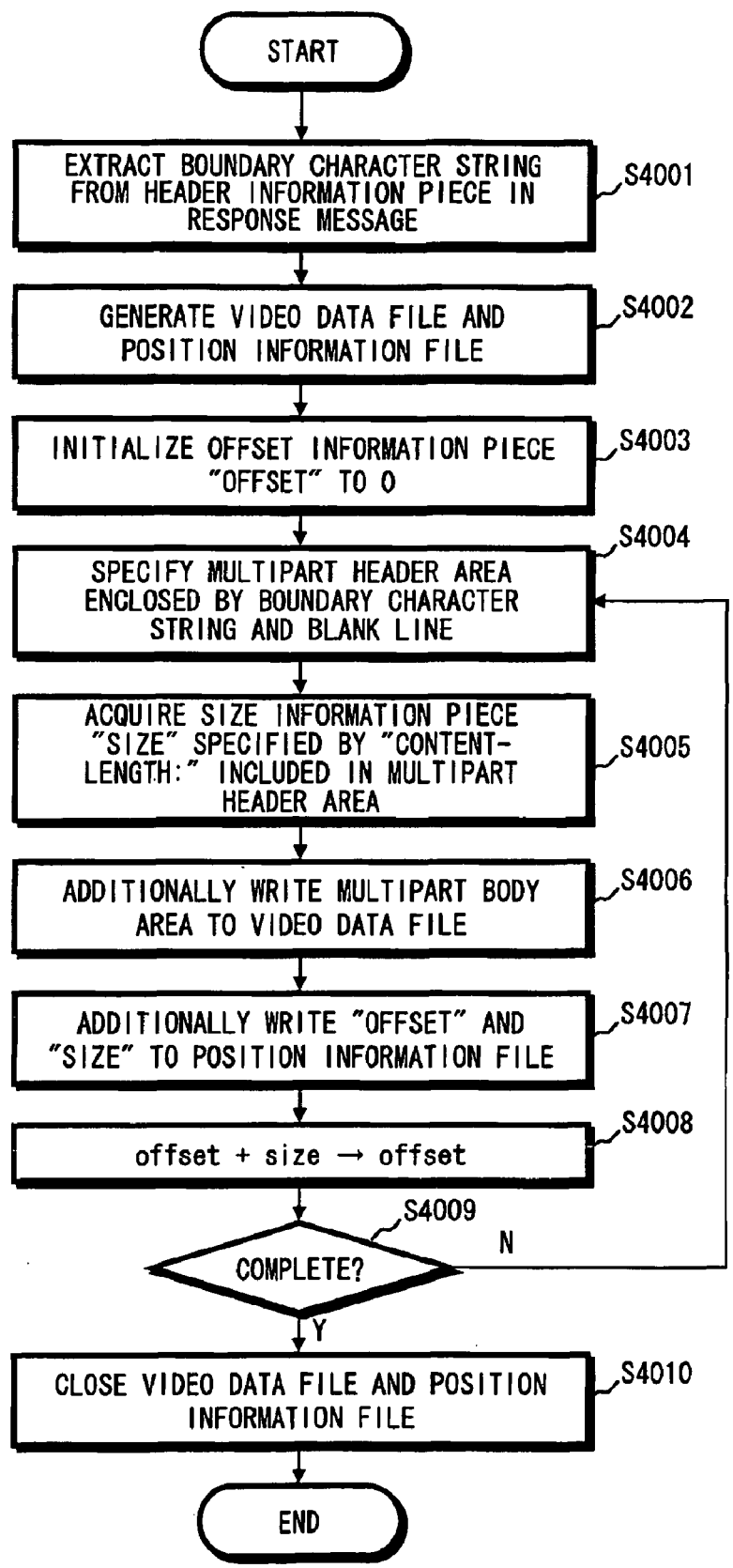
FIG. 4 is a video recording sequence diagram according to embodiment 1 of the present invention.
Figure 5:
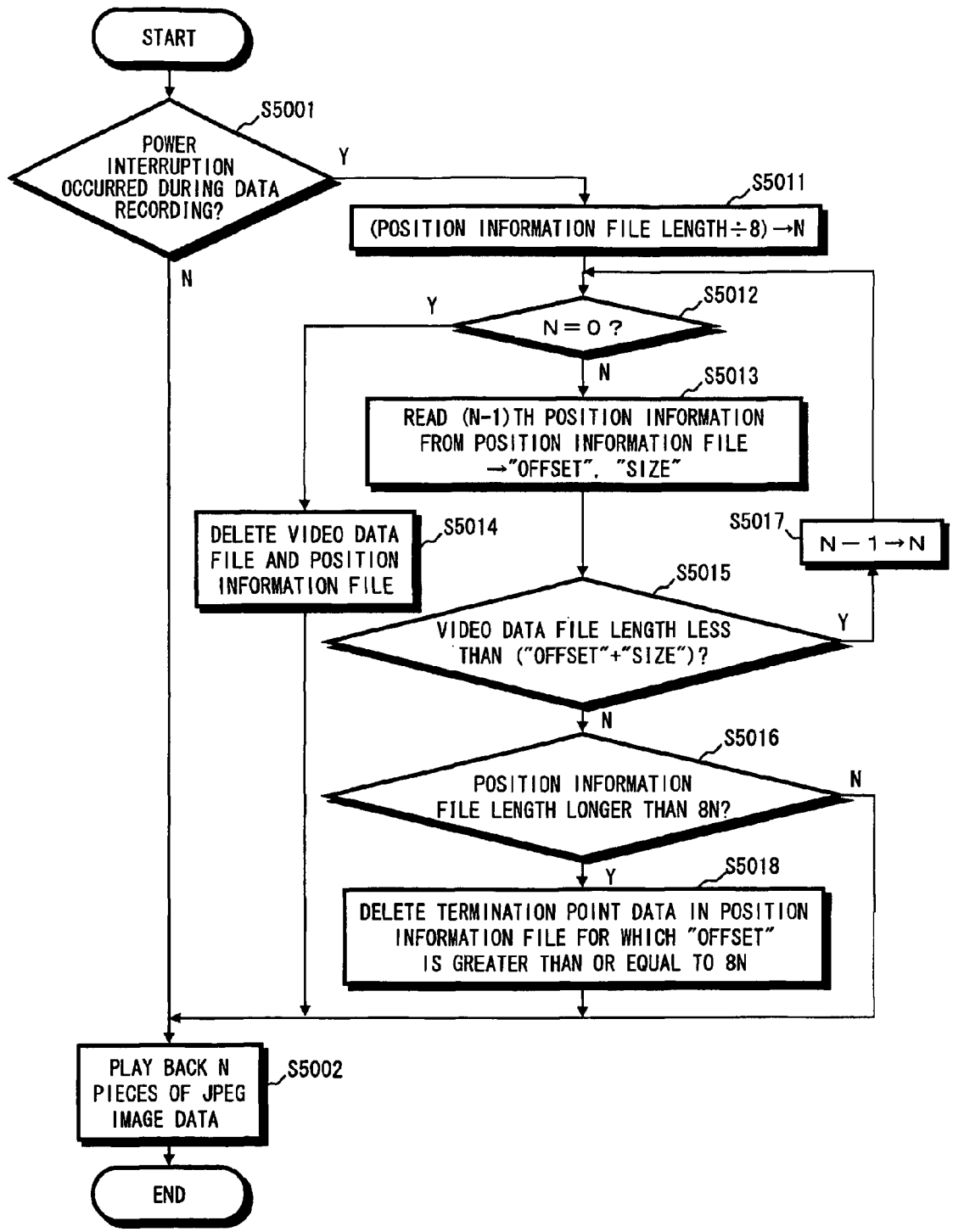
FIG. 5 shows a flow of processing for detecting a damaged portion in a file and playing back the JPEG image data according to embodiment 1 of the present invention.

FIG. 3A shows an exemplary position information file.

FIG. 3B shows an exemplary video data file.

Data stored in the multipart body area included in the response message is sequentially stored to the video data file. In the present embodiment, one frame worth of JPEG image data is stored.

In the example of FIG. 3B, the video data file 1005 includes JPEG image data pieces 3201, 3202, . . . 3204.

The position information file is for consecutively storing, in a time series order, position information for each frame stored in the video data file, and is composed of a list made up of pairs of frame offsets and frame sizes.

One pair of a frame offset and a frame size corresponds to one frame (of JPEG image data) in a video data file.

The frame offset indicates a position of the corresponding frame in the video data file, with respect to a start thereof. Also, the frame size indicates a size of the corresponding frame.

Since the information pieces of frame offset and frame size each have a capacity of 4 bytes, the data size of one frame worth of position information is 8 bytes.

This completes the description of the position information file and the video data file, and the following description returns to the analysis unit 1002.

When the multipart header area is found in the response message, the analysis unit 1002 extracts, from the multipart header area, a value designated in the "Content-length" field as a frame size.

The value designated in the "Content-length" field indicates the size (the frame size is indicated in units of kilobytes (kB), for example) of a multipart body area immediately following the multipart header area.

For example, when the multipart header area 2002 has been found in the response message, the analysis unit 1002 obtains as the frame size the size 1024 kB designated in the "Content-length" field.

Next, the analysis unit 1002 writes the content of the multipart body area (for example, 2003 in FIG. 2) immediately following the multipart header area to the video data file 1005 via the first recording unit 1003 (for example, the JPEG image data piece 3201 of FIG. 3B).

Then, the analysis unit 1002 additionally writes to the position information file 1006, via the second recording unit 1004, a starting position in the video data file of the JPEG image data additionally written to the video data file 1005, a frame offset "offset" and a frame size "size" as position information indicating size.

Also, the analysis unit 1002 calculates a sum of the frame offset and frame size pertaining to the current frame, and the calculated sum is used as a frame offset of a frame to be recorded next.

According to the above, processing is completed for the one frame worth of recording corresponding to the video data file 1005 and the position information file 1006.

Here, if there is a request for processing completion by the completion unit, the video data file 1005 and the position information file 1006 are closed, and recording processing is completed.

According to an instruction from the analysis unit 1002, the first recording unit 1003 generates the video data file 1005, and writes data to the video data file 1005.

Specifically, upon each notification of start position information and size information of the JPEG data from the analysis unit 1002, the first recording unit 1003 reads JPEG data from the RAM 1009 based on the notified information, and additionally writes the read JPEG data to the video data file 1005.

Upon receiving a completion notification from the completion unit, the first recording unit 1003 closes the video data file 1005.

According to an instruction from the analysis unit 1002, the second recording unit 1004 generates the position information file 1006, and writes the data to the position information file 1006.

Specifically, upon each notification of time start position information and size information of the JPEG data from the analysis unit 1002, the second recording unit 1004 additionally writes the frame offset and the frame size to the position information file 1006.

Upon receiving the completion notification from the completion unit, the second recording unit 1004 closes the position information file 1006.

After video recording processing, and in particular upon restarting after a case in which due to a power failure, etc., an interruption occurred before video recording could be completed normally, the detection unit 1012 judges whether a power failure occurred during the video recording.

In one exemplary procedure for detecting that a power supply interruption occurred during the video recording, the detection unit 1012 manages state variables in a nonvolatile memory. The detection unit 1012, at the time of the start of video recording, writes a state variable indicating a video recording start to the nonvolatile memory, and when the video recording ends, changes the state variable to indicate that video recording has ended.

When the video recording apparatus boots, the detection unit 1012 checks the state variable, and if the state variable indicates the video recording start, the detection unit 1012 can determine that a power failure or the like occurred during the recording, and that a power supply interruption occurred during the recording.

Upon determining that a power supply interruption occurred during the recording, the detection unit 1012 notifies the judgment unit 1012 that the power supply interruption occurred.

Upon receiving the notification from the detection unit 1012 that the power supply interruption occurred, the judgment unit 1007 judges whether data damage has resulted from the power failure during recording, and if damage is detected, the judgment unit 1007 notifies position information of the damaged data to a modification unit 1008.

Specifically, the judgment unit 1007 judges whether there is data damaged due to a power failure during recording by comparing a sum obtained by adding a frame offset and a frame size of a frame having a largest frame number in the position information file 1006 to an actual file length of the video data file 1005.

The modification unit 1008, according to the position information of the damaged data notified by the judgment unit 1007, deletes the damaged data portion from the position information file 1006 generated by the second recording unit 1004.

The completion unit 1011 stops the recording processing of the first recording unit 1003 and the second recording unit 1004. The trigger for stopping is a completion of a transmission from a camera, or a completion of reception processing by the reception unit 1001 due to a reason such as a disconnect with the network, or a request to end processing from a user.

If the playback unit 1013 is instructed to play back the video data file via a user instruction or the like, the playback unit 1013 only plays back frames that have not been judged by the judgment unit 1017 to include damaged data, and does not play back the frames that have been judged to include the damaged data.

1.2 Operation 1.2.1 Operations of Transmitting and Receiving Video Data, and Operations During Recording The following describes the operations of the network camera system 100, and the operations of receiving and recording video data by the video recording apparatus 1000, in embodiment 1 of the present invention.

First, the network camera system 100 captures a video, records the captured video as video data in the motion JPEG format, and notifies the video recording apparatus 1000 that the recording has been performed.

Also, the video recording apparatus 1000 receives the notification, and transmits a GET command stipulated in the HTTP protocol to the network camera system 100.

Upon receiving the GET command, the network camera system 100 generates a response message based on the HTTP protocol from each piece of JPEG image data included in the motion JPEG format image data, and transmits the generated response message to the video recording apparatus 1000.

The reception unit 1001 in the video recording apparatus 1000 receives the response message, and stores the response message to the RAM 1009.

The analysis unit 1002 extracts the boundary character string ("- -myboundary") from the header information piece 2001 in the response message stored in the RAM 1009 (S4001), generates a video data file 1005 and a position information file 1006 (S4002), and initializes, to 0, an offset information piece "offset", which is included in the position information file 1006 (S4003).

Upon each reception of a predetermined amount of response messages, the reception unit 1001 notifies the analysis start signal to the analysis unit 1002.

Upon receiving the analysis start signal, the analysis unit 1002 specifies a multipart header area that is enclosed by a boundary character string and a blank line (S4004), and obtains, from the multipart header area specified in S4004, a value specified in the "Content-length" field as a size information piece "size" (S4005).

Next, a multipart body area immediately following the specified multipart header area is additionally written to the video data file 1005 (S4006), and as position information of JPEG data additionally written to the video data file 1005, an "offset" is recorded as a frame offset, and a "size" is additionally written as a frame size to the position information file 1006 (S4007).

Also, for the offset of the next frame, the analysis unit 1002 updates the "offset" to be the sum obtained by adding the "offset" and the "size" (S4008).

This completes the recording processing of one frame worth performed on the video data file 1005 and the position information file 1006.

Here, if a completion of processing is requested by the completion unit (S4009:Y), the video data file 1005 and the position information file 1006 are closed (S4010), and recording processing is completed.

If an end of the processing is not requested by the completion unit (S4009:N), in order to additionally write the video data file 1005 and the position information file 1006 corresponding to the next frame stored in the RAM 1009, the processing from S4004 onward is repeated.

1.2.2. Video Data Playback Processing

The following describes, with reference to the drawings, processing performed by the video recording apparatus 1000 for playing back video data files.

When the video recording apparatus 1000 starts up, first, video recording processing that was previously in operation is performed, and the detection unit 1012 judges whether a power supply interruption occurred due to a power failure or the like during the recording processing (step S5001).

If a judgment is made that a power supply interruption did not occur (step S5001:N), the playback unit 1013 plays back N pieces of JPEG image data recorded in the video data file 1005 in the order of being stored (step S5002).

If a judgment is made that a power supply interruption did occur (step S5001:Y), the judgment unit 1007 divides file lengths of the position information file 1006 into 8 bytes, which is the smallest data size for constituting one frame of position information, and the resulting quotient value is designated as N (step S5011).

Here, the starting 8×N bytes worth of data in the position information file 1006 is found to be valid data of the position information file 1006. When a remainder occurs in the division, a judgment is made that there is damage at the termination point of the position information file 1006.

Next, a judgment is made as to whether N is equal to 0 (step S5012), and if the judgment is affirmative, a judgment is made that valid data does not exist (step S5012:Y), the video data file 1005 and the position information file 1006 are deleted (step S5014), and processing ends.

If the judgment is negative (step S5012:N), the video recording apparatus 1000 reads, from the position information file 1006, a (N−1)th frame offset "offset" and frame size "size" (S5013).

Next, a judgment is made as to whether the file length of the video data file 1005 is less than ("offset"+"size") (step S5015). If the judgment is positive (step S5015:Y), the video data corresponding to the (N−1)th frame is judged to be damaged. Therefore, N is updated to be the value of N−1 (step S5017), and processing is repeated from the judgment of step S5012 onward.

Here, the file length of the video data file 1005 is for example managed by a file system, etc., and the judgment unit 1007 can acquire the file length of the video data file 1005 from the file system, etc.

If the judgment of step S5015 is affirmative (step S5015:Y), N−1 is substituted for N (step S5017), and processing proceeds to step S5012.

If the judgment of step S5015 is negative (step S5015:N), a judgment is made as to whether the file length of the position information file 1006 is longer than 8×N (step S5016). If the judgment of step S5016 is affirmative (S6016:Y), since a judgment can be made that invalid data exists at the termination point of the position information file 1006, termination point data in the position information file 1006 for which the "offset" is greater than or equal to 8×N is deleted (S5018), and the playback unit 1013 plays back the JPEG image data (step S5002).

If the judgment of S5016 is negative (S5016:N), since a judgment can be made that invalid data does not exist at the termination point of the position information file 1006, the playback unit 1013 plays back the N pieces of JPEG image data (step S5002), and processing ends.

As described above, when either the video data file 1005 recorded by the first recording unit 1003, or the position information file 1006 recorded by the second recording unit 1004, or both the video data file 1005 and the position information file 1006 are damaged by a power failure occurring during the recording, merely by comparing the file length of the recorded video data file 1005 to position information of the video data analyzed by the analysis unit 1002 and recorded by the second recording unit 1004, damaged portions of the video data can be specified.

Also, since the position information of parts corresponding to the damaged portions is deleted, at playback time, it is possible to restore the damaged data quickly without referencing the damaged video data by performing playback on the basis of the position information file 1006.

2. Embodiment 2

In the first embodiment, in the system configuration, the first recording unit 1003 and the second recording unit 1004 are not anticipated to operate asynchronously.

In the present embodiment, in the system configuration, it is assumed that the first recording unit 1003 and the second recording unit 1004 operate asynchronously. Asynchronous operation occurs when the first recording unit 1003 and the second recording unit 1004 are implemented as separate tasks, etc.

Figure 6:
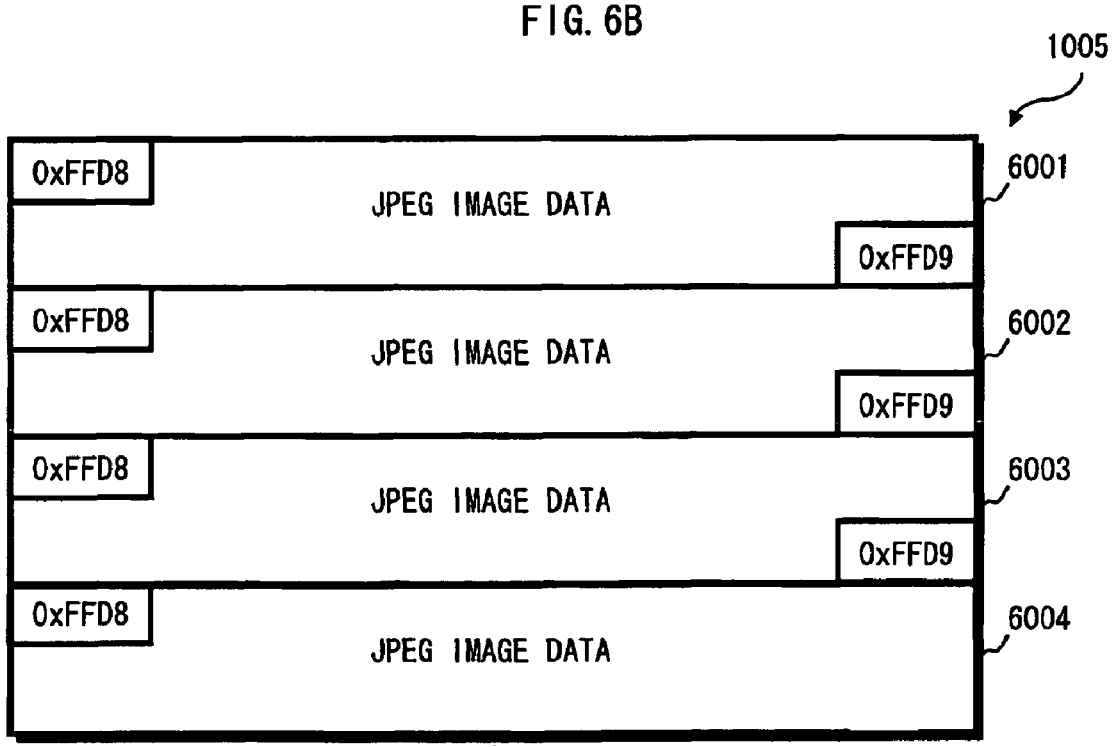
FIGS. 6A and 6B show overall structures of a position information file and JPEG image data according to embodiment 2 of the present invention.

If a power failure, etc. occurs when both recording units are operating in parallel, for example as shown in FIG. 6, an inconsistency arises between the content of the video data file and the position information file.

FIGS. 6A and 6B show an exemplary case in which an inconsistency has arisen. In the video data file, the three frames worth of JPEG image data 6001 to 6003 and the one piece of damaged JPEG image data 6004 are recorded. However, in the position information file, only data pieces 6011 to 6012 corresponding to the two pieces of JPEG image data 6001 to 6002 are recorded.

In embodiment 1, in the JPEG image data for which the entire amount of data is recorded in the image data file, it is assumed that the frame offset and the frame size are recorded in the position information file. Although occurrence of an inconsistency such as described above is anticipated, the restoration of playable data is not performed.

In the present embodiment, for JPEG image data (6003) not registered to a position information file, additional writing processing is performed to additionally write the frame offset and the frame size.

Figure 7:
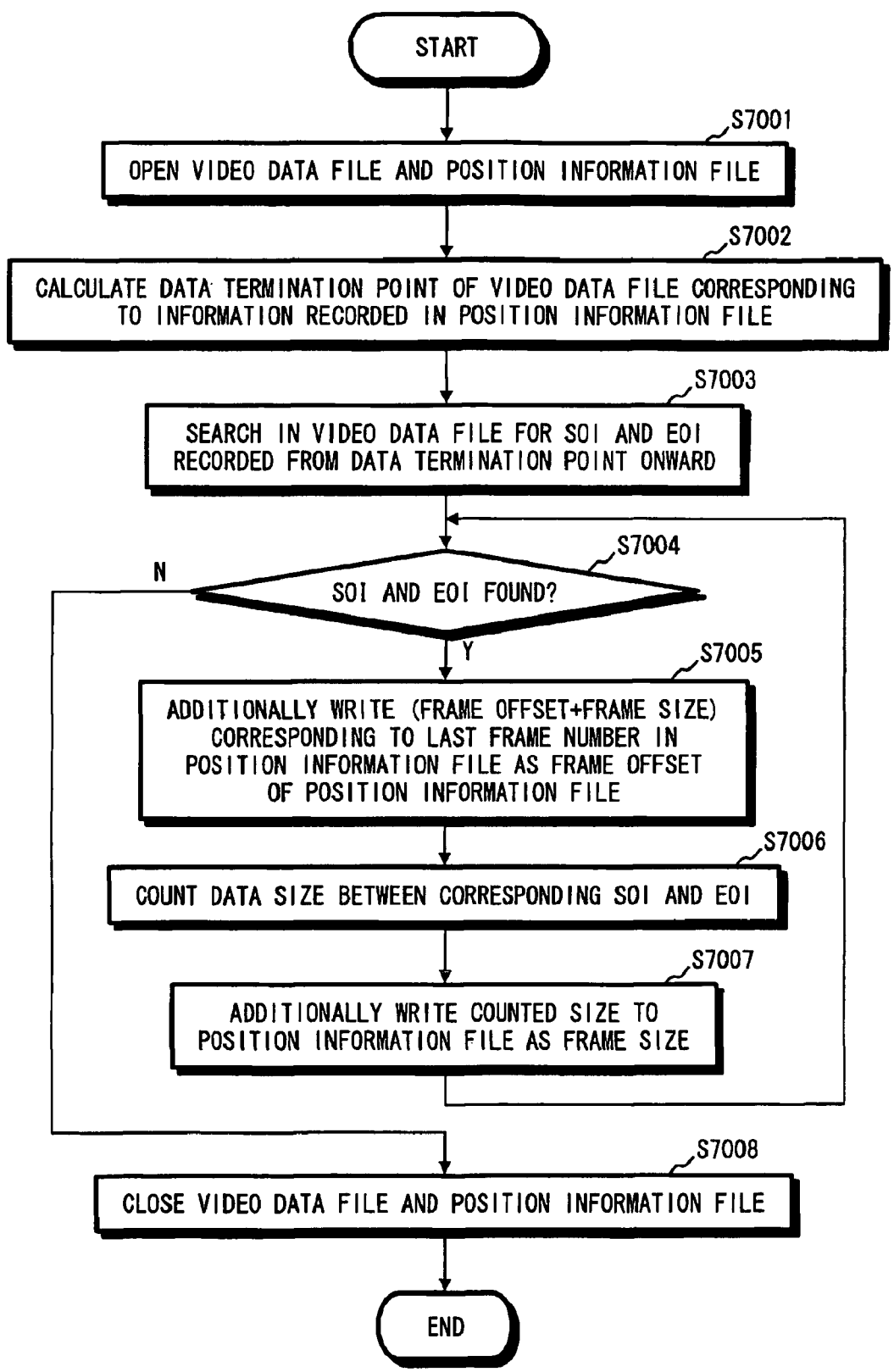
FIG. 7 is a flowchart showing additional writing of a position information file according to embodiment 2 of the present invention.
Figure 9:
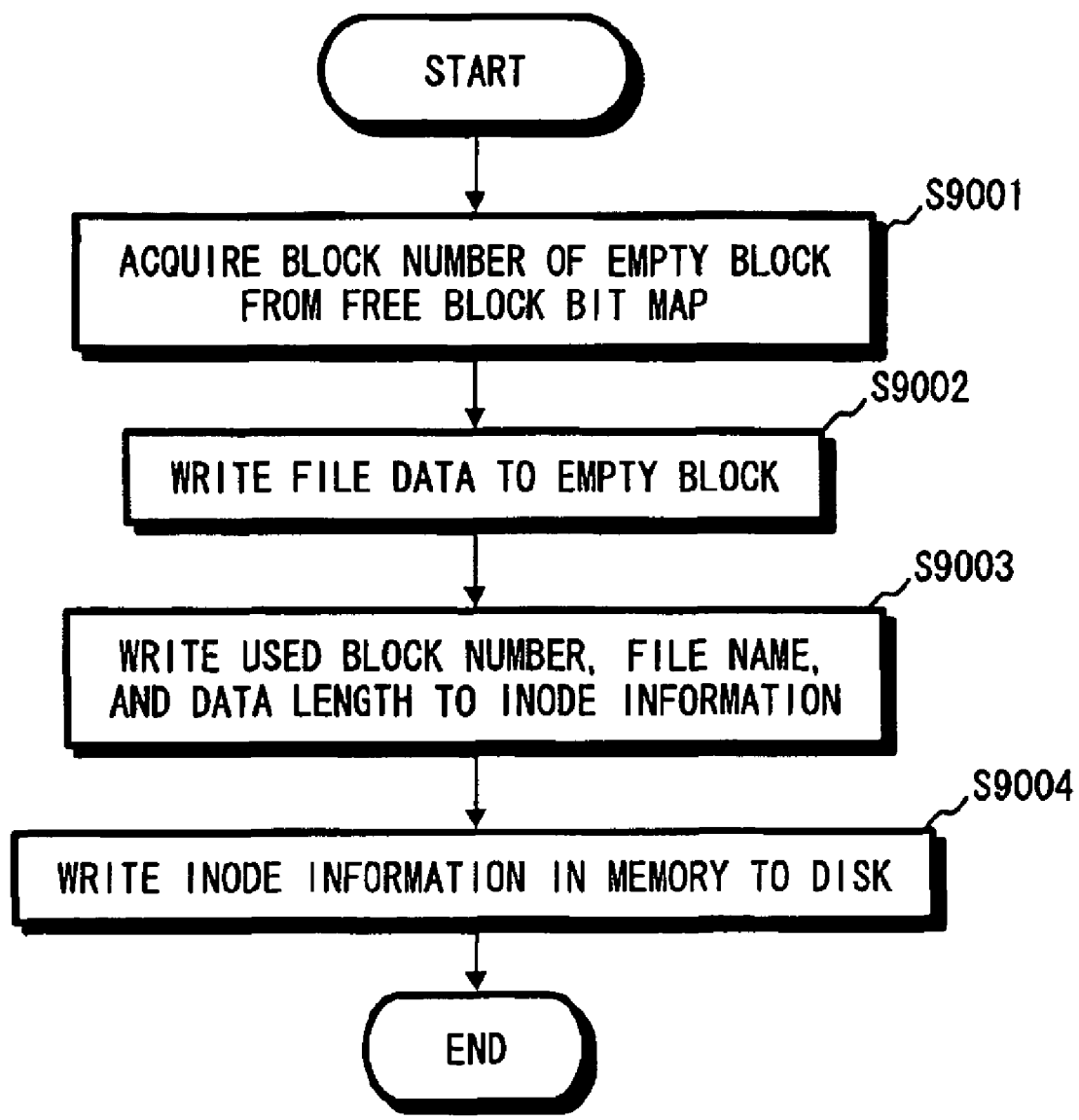
FIG. 9 is a flowchart showing basic operation of a file system according to embodiment 3 of the present invention.

The following describes the additional writing processing with reference to FIG. 7.

Note that the following describes only the portions that are different from embodiment 1.

Note that the additional writing processing is performed at appropriate times, for example, when first starting up after recording in which an inconsistency has arisen due to a power failure, etc.

First, the judgment unit 1007 opens the video data file 1005 and the position information file 1006 (step S7001).

A data termination point of the video data file corresponding to the information recorded in the position information file is calculated (step S7002).

In the example of FIG. 6, the data termination point is a position obtained by adding the frame offset and the frame size for frame number 1.

The data termination point is consistent with the termination point of the JPEG image data 6002 in FIG. 6B (the beginning point of the JPEG image data 6003).

Next, the judgment unit 1007 searches in the video data file for an SOI and an EOI recorded from the data termination point onward (S7003).

In the example of FIGS. 6A and 6B, the SOI and the EOI are found.

If the SOI and the EOI are found (step S7004:Y), the frame offset+frame size corresponding to the last frame number in the position information file are additionally written as the frame offset of the position information file (step S7005).

In the example of FIGS. 6A and 6B, the frame offset+frame size of frame number 1 are additionally written as a frame offset of frame number 2.

The data size of data existing between the SOI and the EOI is counted (step S7006), the counted data size is additionally written to the position information file as a frame size (step S7007), and next the SOI and the EOI are searched for (return to step S7004).

In the example of FIGS. 6A and 6B, the data size of the JPEG image data 6003 is counted and additionally written to the position information file as the frame size of the frame number 2.

In step S7004, if the SOI and the EOI are not found (step S7004:N), the video data file and the position information file are closed (step S7008), and processing is ended.

According to the above processing, the content of the position information file shown in FIG. 6A is updated to the content of the position information file shown in FIG. 8.

4. Embodiment 3

Embodiment 3 is related to performing restoration in a case that, in the above-described structure, a power failure or the like occurs while the file system is performing an operation for writing a file, and an inconsistency arises between the written file and information for managing the file.

Specifically, in a case that a substance of the JPEG image data is recorded and the JPEG image data is not recorded in inode information, which is information for managing the files in which the substance of the JPEG image data is stored, when trouble such as a power failure occurs, restoration processing is performed so that the JPEG image data can be handled.

The following describes the present embodiment in further detail.

First, the file system pertaining to the present embodiment is described.

The file system handles a recording area in the recording medium in block units of a fixed length (for example, 4 kilobytes).

Figures 10A, 10B, 10C, 10D:
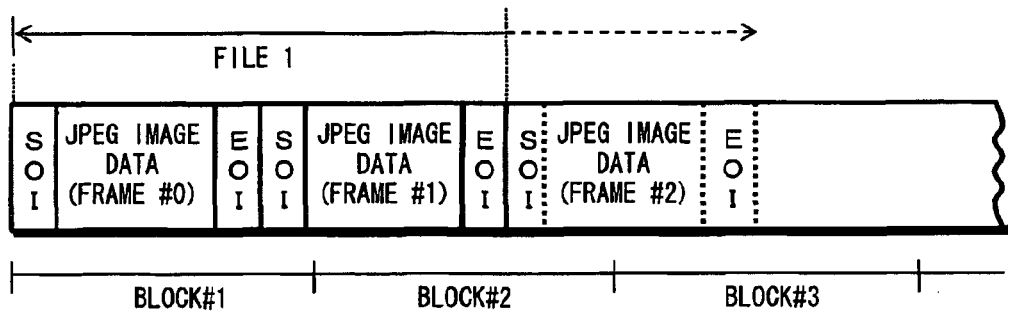
FIG. 10A shows a structure of inode information pertaining to the file system according to embodiment 3 of the present invention.
FIG. 10B shows a structure of a free block bit map pertaining to the file system of embodiment 3 of the present invention.
FIG. 10C shows an example of a file after a power failure has occurred according to embodiment 3 of the present invention.
FIG. 10D shows an example of a position information file of embodiment 3 of the present invention.

The blocks that can be used by an application are managed by the file system, for example, as a free block bit map such as in FIG. 10B.

In this example, the blocks that can be used by an application are the blocks from block number 3 onward, and block numbers 1 to 3 are being used.

Upon receiving a file generation request from the application, the file system, in accordance with a size of the file to be generated, acquires one or more block numbers of one or more empty blocks registered in the free block bit map (step S9001), and allocates the one or more empty blocks to the file.

For example, if the size of the file is 6 kilobytes, the file system allocates two blocks to the application.

Next, upon receiving a write request to write data to the file, the file system writes the file data of the file for which writing is requested to the empty block or blocks corresponding to the file (step S9002).

Then, the file system writes the file data to the inode information pertaining to the file (step S9003).

FIG. 10A shows exemplary inode information.

Inode information is constituted from a list of pairs each including an inode number, a file name, block number(s) of used blocks, and a data length.

The pairs of inode numbers, etc., are additionally written to the inode information at the time of generating the file.

The inode numbers are allocated to the files in 1:1 correspondence.

The file name is the name of the file represented by the inode number. A file name received from the application is used as this file name.

The block number(s) of used blocks are the number(s) of block(s) in which the file is recorded.

The file corresponding to inode number 1 is recorded in blocks having block numbers 1 and 2.

The data length L is the data length of the file.

As an example, the file length of the file corresponding to inode number 1 is 6144 bytes.

Here, the inode information is recorded to the recording area. However, at the time of use, the inode information is temporarily read to the memory and used.

If there is a change in the inode information in the memory, by writing the inode information to the recording area at an appropriate timing, the inode information in the memory and the inode information in the recording area can be synchronized (step S9004).

Next, the following describes processing performed in a case in which, in the file system described above, a power failure or the like occurs after additionally writing the JPEG image data of frame number 2 to file 1, and an inconsistency arises between the inode information and the file actually recorded in the recording area.

FIG. 10C shows a state in which file 1 is recorded in blocks 1 to 3 of the recording area. Here, since the JPEG information data of frame number 2 is additionally written to file 1, the block numbers of used blocks in the inode information are 1, 2, and 3. Although the data length is anticipated to be 9216 bytes, the inode information pertaining to the JPEG image data of frame number 2 has not been updated. Also, at this time, the position information file is only recorded for frame numbers 0 to 1 corresponding to file 1 that is enclosed by a solid line in FIG. 10C.

In this state, since the JPEG image data of frame number 2 does not exist in the inode information, the application cannot use this JPEG image data.

In view of this, to enable using the JPEG image data of frame number 2, before or after an operation is performed to restore the damaged data, the judgment unit 1007 performs recovery processing according to the following procedure, at an appropriate time such as upon restarting the video recording apparatus after the power failure.

First, the judgment unit 1007 acquires, from the file system, an inode number (inode_num) of a file being recorded when the power failure occurred (step S10001).

Here, the file system stores the inode_num of the file being written (in the present example, inode_num=1), while the inode_num of a file for which processing has been interrupted in the midst of writing when the power failure occurred is still stored.

Note that instead of the file system storing the inode_num of the file for which the processing has been interrupted in the midst of writing, the application may store the file name of the file for which the processing has been interrupted in the midst of writing.

The judgment unit 1007 acquires, from the file system, a data length (L) of a file corresponding to the inode_num (step S10002). Also, the judgment unit 1007 acquires a block size (block_size) from the file system (step S10003).

Then, the judgment unit 1007 calculates a remainder r in a case that L is divided by the block_size (=L % block_size), and judges whether r is equal to 0 (step S10004).

If r is not equal to 0 (step S10004:N), a search start position is set to an rth byte of the last block in the file (step S10005). If r is equal to 0 (step S10004:Y), a start of the next block allocated in the free block bit map is acquired from the file system, and set as the search start position (step S10006).

Next, the judgment unit 1007 searches for an SOI recorded from the search start point onward (step S10007). Here, the search is performed for each largest frame size worth of data, and if the SOI is not found (step S10008:N), processing ends.

If the SOI is found (step S10008:Y), the judgment unit 1007 proceeds to search for an EOI (step S10009).

If the EOI is found (step S10010:Y), the data enclosed between the SOI and the EOI is considered to be the JPEG image data, the size of the data enclosed between the SOI and the EOI is considered to be the frame size, the frame size and the frame offset are additionally written to the position information file (step S10011), and processing proceeds to step S10007.

In the example of FIG. 10C, the search start position is the termination point of frame#1 (the start point of frame#2) in block#2. Also, the size of frame#2 is considered to be the frame size, the total size of the frame sizes of frame numbers 0 to 1 is considered to be the frame offset, and the frame size and the frame offset are additionally written to the position information file.

Also, in step S10010, if an EOI is not found (step S10010: N), the judgment unit 1007 judges whether a search range from the SOI is sufficiently broad based on a frame size dictated by the frame rate (step S10012), and if judged to be sufficiently broad (step S10012:Y), ends processing.

If not judged to be sufficiently broad in step S10012 (step S10012:N), for each block registered in the free block bit map, until searching for a largest frame size worth (step S1013), the judgment unit 1007 searches for an EOI (step S10014), and processing proceeds to step S10010.

By performing the above processing, frame#2 becomes usable.

Note that in step S10011, although data enclosed between an SOI and an EOI is considered to be valid JPEG image data, it is difficult to distinguish, merely by finding the SOI and the EOI, whether the data is valid JPEG image data in which only the file management information is missing, or invalid JPEG image data that remains when the file management information is erased as a file erasure by the file system.

Accordingly, the probability of determining whether the JPEG image data is valid or invalid can be improved with use of creation date and time information included in the JPEG image data.

For example, in the present embodiment, restored data is the JPEG image data of frame number 2 in FIG. 10C, and frame numbers 0, 1, and 2 are captured consecutively.

The JPEG image data included in the file includes creation date and time information indicating when the JPEG image data was created.

In view of this, if the creation date and time information of the JPEG image data of frame number 2 and the creation date and time information of the JPEG image data of frame number 1 fulfill a predetermined condition, a judgment is made that the JPEG image data of frame number 2 is also valid.

The predetermined condition is such that the JPEG image data of frame number 2 is judged to be valid data in a case that (a) the creation date and time information of the JPEG image data of frame number 2 indicates a date and time that is further forward in time than the creation date and time information of the JPEG image data of frame number 1, and (b) that the difference between the two creation date and time information pieces is a reasonable range as judged from the frame rate at the time of capturing the image.

If a judgment is made that the data is invalid data, for example, registration of the data to a position information file is not performed.

5. Other Variations, Etc.

Note that although described based on the above embodiments, the present invention is of course not limited to such embodiments. Variations such as the following are also included in the present invention.

(1) In the embodiments described above, the response message transmitted from the network camera system is in the multipart format of the HTTP protocol. However, provided that a frame data size that corresponds to the "Content-length" field of the multipart header area can be acquired, the response message is not limited to being in the above-described format.

Also, if a frame data size corresponding to the "Content-length" field does not exist, by acquiring a frame size by comparing a marker bit existing at a termination point of a start of each JPEG, position information of the frame can be generated.

Also, although the example was described of one piece of JPEG image data being stored in one multipart body area, the present invention is not limited to this. Two or more pieces of JPEG image data may be stored in one multipart body area, or a piece of JPEG image data may be divided and stored in two or more multipart body areas and transmitted.

When two or more pieces of JPEG image data are stored in one multipart body area, and some of the JPEG image data is damaged, modifying the treatment of the position information file is necessary.

In the above embodiments, the modification unit 1008, in accordance with the position information of the damaged data notified by the judgment unit 1007, deletes damaged data portions of the position information file 1006 generated by the second recording unit 1004. However, in the case of the present variation, this type of deletion is not performed, and the actual size of the damaged JPEG image data may be reduced from the frame size included in the position information file.

(2) In the above embodiments, position information corresponding to damaged video data is deleted. However, frames including damaged data may instead be deleted, or both the frames including the damaged data and the corresponding position information may be deleted. This enables performing correct playback merely by referencing the video data file 1005 after restoration, even when video data has been damaged due to a power failure during recording.

(3) Although in the above embodiments, the additional writing of the video data to the video data file 1005 and the additional writing of the position information to the position information file 1006 is performed in order, to make the processing more efficient, such processing may be performed in parallel.

Also, regardless of the fact that writing by the first recording unit 1003 and the second recording unit 1004 to the recording medium 1010 are requested in that order, due to delayed writing caused by the cache processing of the file system, there are cases in which only the request of writing by the second recording unit 1004 is reflected to the recording medium 1010, due to an occurrence of a power failure.

It is self-evident that in both cases described above, according to the detection unit 1012 and the modification unit 1008 of the present video recording apparatus, restoration of the damaged data is possible.

(4) The devices of the above embodiments and variations may be computer systems structured specifically from a microprocessor, a ROM, a RAM, a hard disk unit, a display unit, a keyboard, a mouse, etc. A computer program is stored in the RAM or the hard disk unit. The devices achieve their functions as the microprocessor operates in accordance with the computer program. Instruction code which indicates commands to the computer is structured as a combination of multiple instruction codes in order for the computer program to achieve predetermined functions.

Note that the present invention is not limited to being a computer system that includes all of the elements of a microprocessor, a ROM, a RAM, a hard disk unit, a display unit, a keyboard, a mouse, etc.

(5) A portion or all of the constituent elements of the devices of the above embodiments and variations may be structured as a single system LSI (Large Scale Integration). A system LSI is a super multifunctional LSI manufactured by integrating a plurality of structural units onto a single chip. Specifically, it is a computer system including a microprocessor, a ROM, a RAM, and the like. A computer program is stored in the RAM. The system LSI achieves its functions as the microprocessor operates in accordance with the computer program.

Also, here, although referred to as a system LSI, an integrated circuit generated as described above may also be referred to as an IC, a system LSI, a super LSI, or an ultra LSI, depending on the degree of integration.

Also, the method of integration is not limited to being LSI integration, but instead may be realized by a dedicated circuit or a general-purpose process. After LSI manufacture, the use of a field programmable gate array (FPGA) or a silicon flexible processor in which the connection and settings of circuit cells in the LSI can be restructured is possible.

Furthermore, if integration technology is developed that replaces LSIs due to progressive or derivative semiconductor technology, integration of functional blocks using this technology is naturally possible. For example, the application of biotechnology is a possibility.

(6) A portion or all of the constituent elements of the devices of the above embodiments and variations may be structured as a removable IC card or stand-alone module. The IC card or the module is a computer system including a microprocessor, a ROM, and a RAM. The IC card and the module may include the above super multifunctional LSI. The IC card and the module achieve their functions as the microprocessor operates in accordance with the computer program. This IC card or module may be tamper resistant.

(7) The present invention may be the methods shown above Also, the present invention may be computer programs for causing computers to realize the methods, or may be digital signals representing the computer programs.

Also, the present invention may be a computer-readable recording medium such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded. The present invention may be the computer programs or the digital signals which are recorded on these recording media.

Also, the present invention may be the computer programs or digital signals which are transmitted via an electronic communications circuit, a wireless or fixed-line communications circuit, a network such as the Internet, a data broadcast, etc.

Also, the present invention may be carried out by another independent computer system by transferring the programs or the digital signals which have been recorded on the recording media, or by transferring the programs or the digital signals via the network, etc.

(8) The present invention may be any combination of the above embodiments and variations.

INDUSTRIAL APPLICABILITY

The video recording apparatus pertaining to the present invention is useful as a video recording apparatus that receives video data from a monitoring camera via a network, records the received video data, and performs recovery processing on the data if the recording is interrupted due to a power failure etc., and is used in a monitoring system or the like. Also, the present invention is to be manufactured, sold, etc. as a video recording apparatus, etc. included in a monitoring system by a manufacturer and distributor of home electronics.

The invention claimed is:

1. A video recording apparatus that records a plurality of frame image data pieces, comprising:
 a reception unit operable to receive communication data including a plurality of pairs of a frame image data piece and a size information piece indicating a size of the frame image data piece;
 a recording unit operable to extract the frame image data pieces and the size information pieces from all of the pairs in the communication data and to record the extracted size information pieces and frame image data pieces to a recording medium;
 a comparison unit operable to compare (i) a total actual size that is a total of actual sizes of all of the frame image data pieces recorded on the recording medium and (ii) a total management size that is a total of sizes indicated by the size information pieces;

a specification unit operable to, when the total actual size is smaller than the total management size, with use of (i) a difference between the total actual size and the total management size and (ii) the size information pieces, specify an incomplete frame image data piece from which data is partially missing; and a management unit operable to prevent playback of the specified incomplete frame image data piece.

2. The video recording apparatus of claim 1, wherein
the recording unit sequentially records the frame image data pieces to logically consecutive areas in the recording medium,
the recording unit is further operable to, for each size information piece, calculate an offset that is a total size of all frame image data pieces recorded in advance of the frame image data piece pertaining to the size information piece, and record the size information pieces in correspondence with the respective offsets thereof, and
the specification unit is further operable to detect, with use of the offsets, a starting position of the incomplete frame image data piece.

3. The video recording apparatus of claim 2, wherein
the specification unit includes
a selection subunit operable to select each of the offsets corresponding to the respective size information pieces in a reverse order starting from a most recently recorded offset,
a search subunit operable to, each time an offset is selected by the selection subunit, search for an incomplete frame image data piece recorded from a position indicated by the offset onwards in the consecutive areas, and
a determination subunit operable to, if an incomplete frame image data piece is found, determine that the starting position is an offset corresponding to the size information pertaining to the incomplete frame image data piece.

4. The video recording apparatus of claim 2, wherein
the specification unit, to prevent the playback of the incomplete frame image data piece, is further operable to delete a size information piece and an offset corresponding to the incomplete frame image data piece.

5. The video recording apparatus of claim 2, wherein
the management unit is further operable to delete, from the recording unit, any size information pieces and any offsets recorded in a recording area from the starting position onwards.

6. The video recording apparatus of claim 1, wherein
the communication data includes a plurality of parts that are compliant with HTTP,
each of the parts respectively includes one pair of a frame image data piece and a size, and
the recording unit, for each of the parts, extracts a size included in the part as a size information piece, extracts a frame image data piece included in the part, and records the extracted size information piece and the extracted frame image data piece, in correspondence with each other, to the recording medium.

7. The video recording apparatus of claim 1, wherein
the specification unit is further operable to judge whether a total size of the size information pieces recorded on the recording medium is a multiple of a predetermined size, and if the judgment is negative, to delete a last-recorded size information piece.

8. The video recording apparatus of claim 1, further comprising:
a search unit operable to, if the total actual size is larger than the total management size, with use of the total management size, search for a frame image data piece from a specified search start position; and
an additional writing unit operable to, if a frame image data piece is found by the search unit, calculate a size of the found frame image data piece, and additionally write a size information piece indicating the calculated size to the recording medium.

9. The video recording apparatus of claim 1, further comprising:
a file system, wherein
the file system allocates recording areas in the recording medium to files, and
all of the frame image data pieces are stored in one file,
the video recording apparatus further including
a search unit operable to, if a power supply interruption is detected, search for a frame image data piece recorded in a recording area to be next allocated by the file system; and
an additional writing unit operable to, if the frame image data piece is found, calculate a size of the frame image data piece and additionally write the calculated size to the recording medium as the size information piece.

10. The video recording apparatus of claim 9, wherein
each frame image data piece includes a time stamp, and
the additional writing unit only performs the additional writing if the time stamp of the frame image data piece found in the search indicates a later date and time than the time stamp of a last frame image data piece stored in the file.

11. The video recording apparatus of claim 1, wherein
the recording unit further includes
a first recording subunit operable to record the frame image data piece to the recording medium, and
a second recording subunit operable to record the size information piece to the recording medium, wherein
the first recording subunit and the second recording subunit perform recording asynchronously.

12. A video recording method for recording a plurality of frame image data pieces, comprising:
a reception step of receiving communication data including a plurality of pairs of a frame image data piece and a size information piece indicating a size of the frame image data piece;
a recording step of extracting the frame image data pieces and the size information pieces from all of the pairs in the communication data and recording the extracted size information pieces and frame image data pieces to a recording medium;
a comparison step of comparing (i) a total actual size that is a total of actual sizes of all of the frame image data pieces recorded on the recording medium and (ii) a total management size that is a total of sizes indicated by the size information pieces;
a specification step of, when the total actual size is smaller than the total management size, with use of (i) a difference between the total actual size and the total management size and (ii) the size information pieces, specifying an incomplete frame image data piece from which data is partially missing; and
a management step of preventing playback of the specified incomplete frame image data piece.

13. A video recording program embodied in a non-transitory recording medium used in a video recording apparatus that records a plurality of frame image data pieces, comprising: a reception step of receiving communication data including a plurality of pairs of a frame image data piece and a size information piece indicating a size of the frame image data piece; a recording step of extracting the frame image data pieces and the size information pieces from all of the pairs in the communication data and recording the extracted size information pieces and frame image data pieces to the non-transitory recording medium; a comparison step of comparing (i) a total actual size that is a total of actual sizes of all of the frame image data pieces recorded on the non-transitory recording medium and (ii) a total management size that is a total of sizes indicated by the size information pieces; a specification step of, when the total actual size is smaller than the total management size, with use of (i) a difference between the total actual size and the total management size and (ii) the size information pieces, specifying an incomplete frame image data piece from which data is partially missing; and a management step of preventing playback of the specified incomplete frame image data piece.

14. An integrated circuit for recording a plurality of frame image data pieces, comprising:

a reception step of receiving communication data including a plurality of pairs of a frame image data piece and a size information piece indicating a size of the frame image data piece;

a recording step of extracting the frame image data pieces and the size information pieces from all of the pairs in the communication data and recording the extracted size information pieces and frame image data pieces to a recording medium;

a comparison step of comparing (i) a total actual size that is a total of actual sizes of all of the frame image data pieces recorded on the recording medium and (ii) a total management size that is a total of sizes indicated by the size information pieces;

a specification step of, when the total actual size is smaller than the total management size, with use of (i) a difference between the total actual size and the total management size and (ii) the size information pieces, specifying an incomplete frame image data piece from which data is partially missing; and a management step of preventing playback of the specified incomplete frame image data piece.

* * * * *